Nov. 24, 1925.
A. W. COPLAND
1,562,438
METHOD OF TRUING GEARS
Filed Jan. 15, 1921
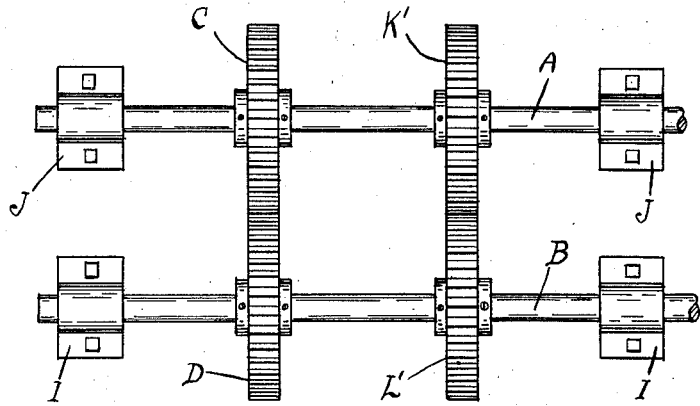
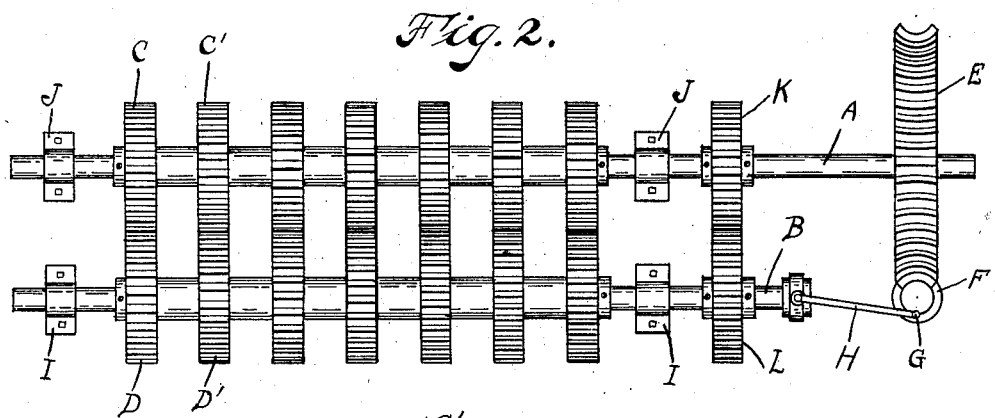
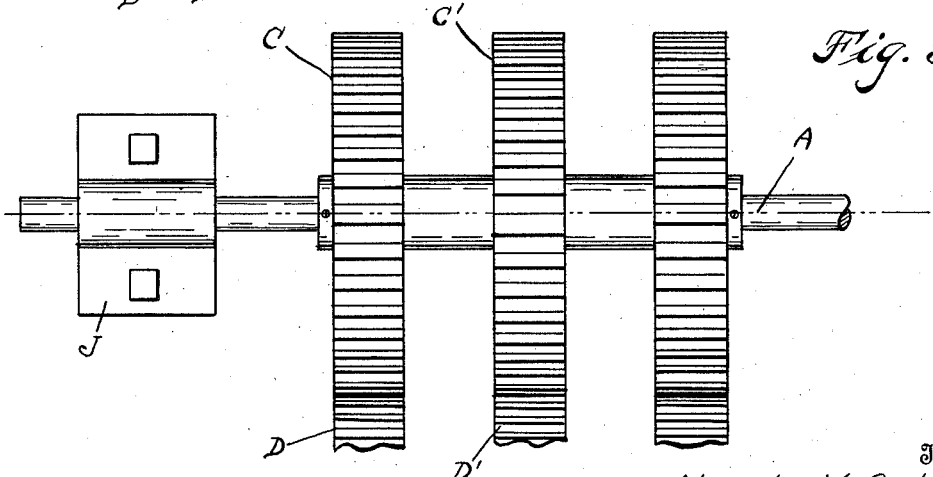
Inventor
Alexander W. Copland
By Whittemore Hulbert & Whittemore
Attorneys Patented Nov. 24, 1925.

1,562,438

UNITED STATES PATENT OFFICE.

ALEXANDER W. COPLAND, OF DETROIT, MICHIGAN.

METHOD OF TRUING GEARS.

Application filed January 15, 1921. Serial No. 437,489.

*To all whom it may concern:*

Be it known that I, ALEXANDER W. COPLAND, a citizen of the United States of America, residing at Detroit, in the county of Wayne and State of Michigan, have invented certain new and useful Improvements in Methods of Truing Gears, of which the following is a specification, reference being had therein to the accompanying drawings.

The invention relates to the manufacture of gears and has particular reference to a process for truing the same so as to eliminate slight inaccuracies resulting from machining and from heat treatment. In the present state of the art one method frequently employed for truing gears is known as lapping and consists in running a pair of gears in mesh with each other with an abrasive substance on the contacting surfaces. One serious defect in this process is due to the fact that only slight cutting is effected, excepting where there is a relative movement of the contacting surfaces. When, however, the gears are run in mesh, there is no relative movement along the pitch line contacts and these portions of the teeth therefore remain substantially unground. A further defect is that a true tooth in mesh with inaccurate teeth will by the usual lapping process be rendered inaccurate, as the abrasive action takes place on both of the contacting surfaces. This is for the reason that the relative rotation of the gears is determined solely by the teeth thereof, which are in contact.

It is the object of the present invention to employ the lapping method for truing the gears, eliminating the defects above mentioned. This I accomplish; first, by controlling the relative rotational movements of the gears being ground by means independent of the intermeshing teeth thereof; second, by subjecting the intermeshing gears to an equal relative movement of all portions of the contacting surfaces; third, by simultaneously operating on a series of intermeshing gears, so that the irregularities in different pairs will tend to neutralize each other and to produce a more uniform action on the whole series; fourth, by differentially setting the several pairs of gears, which are simultaneously operated upon so that the teeth thereof will not be in precisely the same relative position at the same time; and fifth, by other improvements as hereinafter set forth.

In the drawings;

Figure 1 is a diagram illustrating the method of truing gears, in which the relative movements thereof are controlled by master gears;

Figure 2 is a similar diagram showing series of intermeshing gears simultaneously operated upon, their relative movements being controlled conjointly by all of the members of the series;

Figure 3 is a similar diagram showing series of gears simultaneously operated upon, but differentially arranged in angular relation.

My improved process may be carried out by different forms of apparatus, but as shown in Figure 2, A and B are two shafts or arbors arranged parallel to each other and having mounted thereon a series of co-operating gears C, C', etc. and D, D', etc. One of the shafts such as A is rotatively driven by suitable means, such as the worm wheel E thereon in mesh with the actuating worm F. The other shaft has imparted thereto an axial reciprocation by suitable means such as the crank G and pitman H and the relation of these drive mechanisms is such that the shaft B is reciprocated many times to each rotation of the shaft A. The shaft B is also mounted in bearings I which are laterally adjustable with respect to the bearings J for the shaft A, which permits of changing the distance between centers of said shafts. The series of gears C, C' and D, D' are preferably arranged upon their respective shafts so as to space the gears from each other by a distance no less than the reciprocation of the shaft B. They are also preferably arranged as shown in Figure 3, so that the teeth of the successive gears will be staggered or slightly offset rotatively in relation to each other. The two series are similarly offset and therefore while each pair of gears is in mesh, they are in relatively different positions at the same time. The shafts A and B are limited in their adjustment towards each other by a suitable stop, such for instance as a pair of master gears K and L, which are highly accurate in their construction.

With the apparatus as above described in carrying out my improved method of truing the gears after the two series have been properly positioned upon their respective shafts, an abrasive material is placed upon the surface of the teeth and the apparatus is set in movement. This will cause a slow rotation of the pairs of gears in mesh with each other and at the same time a relative longitudinal or axial reciprocation, which will rub the contacting surfaces against each other, causing the abrasive material to cut off the high points. Inasmuch as the irregularities in the different gears will not all be the same, the abrasive action will at the start only take place upon the teeth which are farthest from the true surface. Furthermore, as the irregularities are not all alike, they will tend to counteract each other so that in the final finished product there will be an average which closely approximates the true form. The master gears will also assist in holding the series in such relation as to produce the true form, while the staggering or spiral offsetting of the successive gears will have a further equalizing effect.

My improved method as above described has the great advantage that a large number of gears can be under treatment at the same time and as the correction is due to an averaging of the irregularities of the whole group, there is no part of the apparatus to get out of order or lose its accuracy. The process may also be carried out with great rapidity because of the large number of gears that are simultaneously operated upon.

As shown in Figure 1, instead of controlling the relative movements of the shafts A and B by the conjoint action of a series of gears operated upon, such movements are controlled by accurate master gears K′, L′, and therefore, a single pair of intermeshing gears such as C and D may be operated upon to produce accurate results. The apparatus is otherwise the same as shown in Figures 2 and 3.

My method differs from all other methods used for truing by grinding, in that the performance of the work has no destructive effect upon the master. For instance, where gears are trued by the action of a formed grinder wheel, the work performed tends to destroy the true form of said grinder. On the other hand, with my process the work performed upon the surface of one tooth is simultaneously gearing the intermeshing tooth and both teeth are constantly approaching accuracy. This is not true in the ordinary lapping process as applied to gears, for the reason that the movements are only controlled by the intermeshing teeth that are being ground and therefore an inaccuracy in one gear while being geared may produce an inaccuracy in a contacting tooth which was previously non-existent. Therefore, it is an all-essential feature of my process that the relative rotational movements of the intermeshing gears, which are being operated upon, should be accurately controlled.

What I claim as my invention is:

1. The process of truing gears which consists in simultaneously lapping groups of intermeshing gears, the gears of each group being in fixed relation to each other, and the teeth of the gears in each group being arranged in staggered relation whereby an averaging of irregularities is effected.

2. The process of truing gears comprising the mounting of a plurality of intermeshing gears upon parallel arbors, the gears on each arbor being in fixed relation to each other, and the teeth of successive gears being arranged in staggered relation and simultaneously rotating and reciprocating one group of gears relative to the other to lap the teeth.

3. The process of truing gears comprising the mounting of a series of gears upon an arbor in fixed relation to each other and having teeth on successive gears arranged in staggered relation, similarly mounting another series of gears upon a parallel arbor in mesh with said first series and simultaneously rotating and axially reciprocating one of said series with respect to the other.

4. The process of truing gears which consists in lapping of the intermeshing gears by the relative reciprocation thereof transverse to the plane of rotation and the simultaneous rotation of the intermeshing gears to generate the tooth contour, the timing between said rotational and reciprocatory movements being such as to provide a relatively large number of reciprocations for each rotation of the gears.

In testimony whereof I affix my signature.

ALEXANDER W. COPLAND.